United States Patent
Mindel et al.

(10) Patent No.: US 12,463,864 B2
(45) Date of Patent: Nov. 4, 2025

(54) AUTO-PROVISIONING FOR CUSTOMER PREMISES EQUIPMENT (CPE) DOWNSTREAM OF A CELLULAR MODEM

(71) Applicant: Cisco Technology, Inc., San Jose, CA (US)

(72) Inventors: David J. Mindel, Lansdale, PA (US); Dan Frey, Front Royal, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/160,499

(22) Filed: Jan. 27, 2023

(65) Prior Publication Data

US 2024/0259260 A1    Aug. 1, 2024

(51) Int. Cl.
*H04L 41/0806* (2022.01)
*H04L 41/5006* (2022.01)
*H04W 24/02* (2009.01)

(52) U.S. Cl.
CPC ...... *H04L 41/0806* (2013.01); *H04L 41/5006* (2013.01); *H04W 24/02* (2013.01)

(58) Field of Classification Search
CPC . H04L 41/0806; H04L 41/5006; H04W 24/02
See application file for complete search history.

(56) References Cited

U.S. PATENT DOCUMENTS

| | | |
|---|---|---|
| 2018/0191563 A1 | 7/2018 | Farmanbar et al. |
| 2020/0092253 A1 | 3/2020 | Gray |
| 2020/0187085 A1* | 6/2020 | Jagannatha ......... H04L 41/5041 |
| 2020/0244529 A1* | 7/2020 | Dehaine ............. H04L 41/0866 |
| 2020/0274764 A1* | 8/2020 | Guilbeault ............. H04L 47/70 |
| 2021/0006535 A1 | 1/2021 | Kolanowski et al. |
| 2021/0259028 A1* | 8/2021 | Zhang ................... H04W 40/02 |
| 2023/0269136 A1* | 8/2023 | Gupta .................. H04W 76/10 |
| | | 370/254 |

FOREIGN PATENT DOCUMENTS

WO    2022010247    1/2022

* cited by examiner

*Primary Examiner* — Suraj M Joshi
(74) *Attorney, Agent, or Firm* — Polsinelli P.C.

(57) ABSTRACT

In one aspect, a method includes determining network information for one or more network slices of a wireless network, the network information for the one or more network slices being available at a modem associated with a network appliance and interfacing with the wireless network, converting the network information into a standards-based format, determining configuration parameters for the one or more network slices using the network information, and configuring the network appliance using the configuration parameters.

17 Claims, 10 Drawing Sheets

AUTO-PROVISIONING FOR CUSTOMER PREMISES EQUIPMENT (CPE) DOWNSTREAM OF A CELLULAR MODEM

FIELD OF THE INVENTION

The subject matter of this disclosure generally relates to the field of computer networking and, more particularly to auto-provisioning for customer premises equipment (CPE) devices either with an embedded cellular radio or directly connected to customer premises equipment (CPE) cellular gateway with an embedded cellular radio.

BACKGROUND

Fifth generation (5G) mobile and wireless networks will provide enhanced mobile and fixed wireless broadband communications and are intended to deliver a wider range of services and applications as compared to all prior generations of cellular wireless networks. Compared to prior generations of mobile and wireless networks, the 5G architecture is service based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Today, provisioning and configuration of 4G and 5G-related CPEs and the Wide Area Networks (WANs) are isolated processes. If there is a 4G Quality of Service (QOS) Traffic Flow Template (TFT) or 5G Service Data Flows (SDF)/QoS Flow ID (QFI), for a 4G data APN or 5G slice/Data Network Name (DNN), that information is provided to the UE modem/module/radio. The provisioning/configuration stops there.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
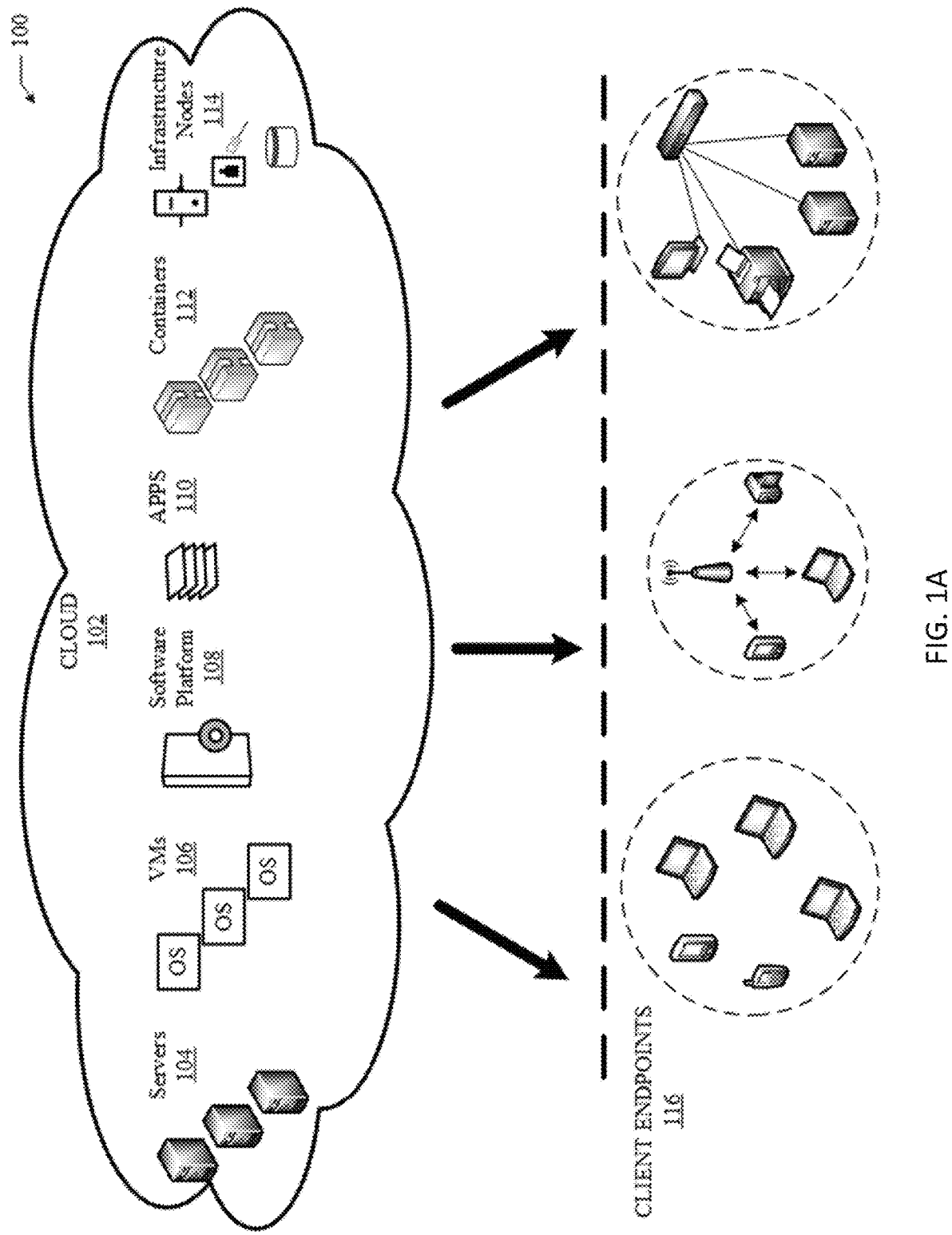
FIG. 1A illustrates an example cloud computing architecture according to some aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

The present disclosure is directed towards automatically and dynamically translating and delivering 5G network characteristics into a standard CPE configuration with which network CPEs can be provisioned. As will be described below, this automatic translation and delivery of 5G network characteristics to network CPEs would provide a fast error-free and operationally easy method to dynamically leverage 5G public or private network functions by enterprise network devices. Without this, manual mapping is done, which is error-prone, causes deployment delay, and takes human resources, limiting its deployment and increasing operational costs.

In one aspect, a method includes determining network information for one or more network slices of a wireless network, the network information for the one or more network slices being available at a modem associated with a network appliance and interfacing with the wireless network, converting the network information into a standards-based format, determining configuration parameters for the one or more network slices using the network information, and configuring the network appliance using the configuration parameters.

In another aspect, the network information includes one or more of a number of network slices, one or more of an IPV4/IPv6 address and mask, a default gateway address, a DNS server identification, QoS templates including QoS classification, QoS behavior per traffic class, and ingress policing value.

In another aspect, the configuration parameters include one or more of network interfaces, a quality of service (QOS) policy, and pathing information.

In another aspect, determining the network information includes querying the modem for the network information.

In another aspect, the network information is converted into the standards-based format using one or more data models.

In another aspect, the method further includes transmitting the configuration parameters to a network management system to be approved, and updating the network appliance with the configuration parameters.

In another aspect, the network appliance is one of a router or a gateway of an enterprise network.

In one aspect, a device includes one or more memories having computer-readable instructions stored therein, and one or more processors. The one or more processors are configured to execute the computer-readable instructions to determine network information for one or more network slices of a wireless network, the network information for the one or more network slices being available at a modem associated with a network appliance and interfacing with the wireless network, convert the network information into a standards-based format, determine configuration parameters for the one or more network slices using the network information, and configure the device using the configuration parameters.

In one aspect, one or more non-transitory computer-readable media include computer-readable instructions, which when executed by one or more processors of a network appliance, cause the network appliance to determine network information for one or more network slices of a wireless network, the network information for the one or more network slices being available at a modem associated with a network appliance and interfacing with the wireless network, convert the network information into a standards-based format, determine configuration parameters for the one or more network slices using the network information; and configure the network appliance using the configuration parameters.

DESCRIPTION OF EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In current 4G and/or 5G systems, provisioning and configuration of 4G and 5G-related CPEs and the Wide Area Networks (WANs) are isolated processes. If there is a 4G Quality of Service (QOS) Traffic Flow Template (TFT) or 5G Service Data Flows (SDF)/QoS Flow ID (QFI), for a 4G data APN or 5G slice/Data Network Name (DNN), that information is provided to the UE modem/module/radio. The provisioning/configuration stops there. Additionally, if there are multiple dual-data APNs or slices provisioned, the information is provided by the network management component to a UE's modem/module/radio. Also, pathing information from the 4G/5G network to the UE is limited to the Dynamic Host Configuration Protocol (DHCP)-provided default route from the network. These steps often create a plurality of manual processes, by a command line configuration or manually defined templates, to map services from the network to the CPE(s) in the network, even though the information is available in the 5G modem/radio. The mapping of the services often times may include a path through one or more network CPE devices such as a router, a firewall, an L3 switch with the CPE being behind a cellular gateway. Thus, there is an isolation of information between the 5G radio and the IP function of the CPEs unless a manual process is integrated, which results in delay, errors, and additional cost in fully leveraging the service.

The disclosed technology addresses the need in the art for automatically and dynamically translating and delivering 5G network characteristics into a standard CPE configuration. The advantages of this technology would provide a fast, error-free, and operationally efficient method to dynamically leverage 5G public or private network functions by enterprise network devices. Otherwise, manual mapping would need to be completed, which increases the opportunity for error-prone network communication and interactions, causes deployment delay, and increase the needs for additional human resources, thus, limiting its deployment and increasing operational costs.

For example and as will be described in more detail below, an operator can offer enhanced voice and video calling over a separate 5G slice, with a guaranteed Service Level Agreement (SLA) and improved QoS in addition to a best-effort default slice. An enterprise could choose to purchase that for better communications and the new slice would automatically be added to the network with a click on the Service Provider (SP) 5G services portal. In this example, the added voice/video calling slice can be used for any voice or video traffic marked DiffServ Code Point (DSCP) expedited forwarding (EF) and SCCP/H225/H254/MGCP signaling packets marked CS3 or AF31. The flow would be from the 5G network to the 5G modem, followed by the 5G modem to the CPE.

Figure 1B:
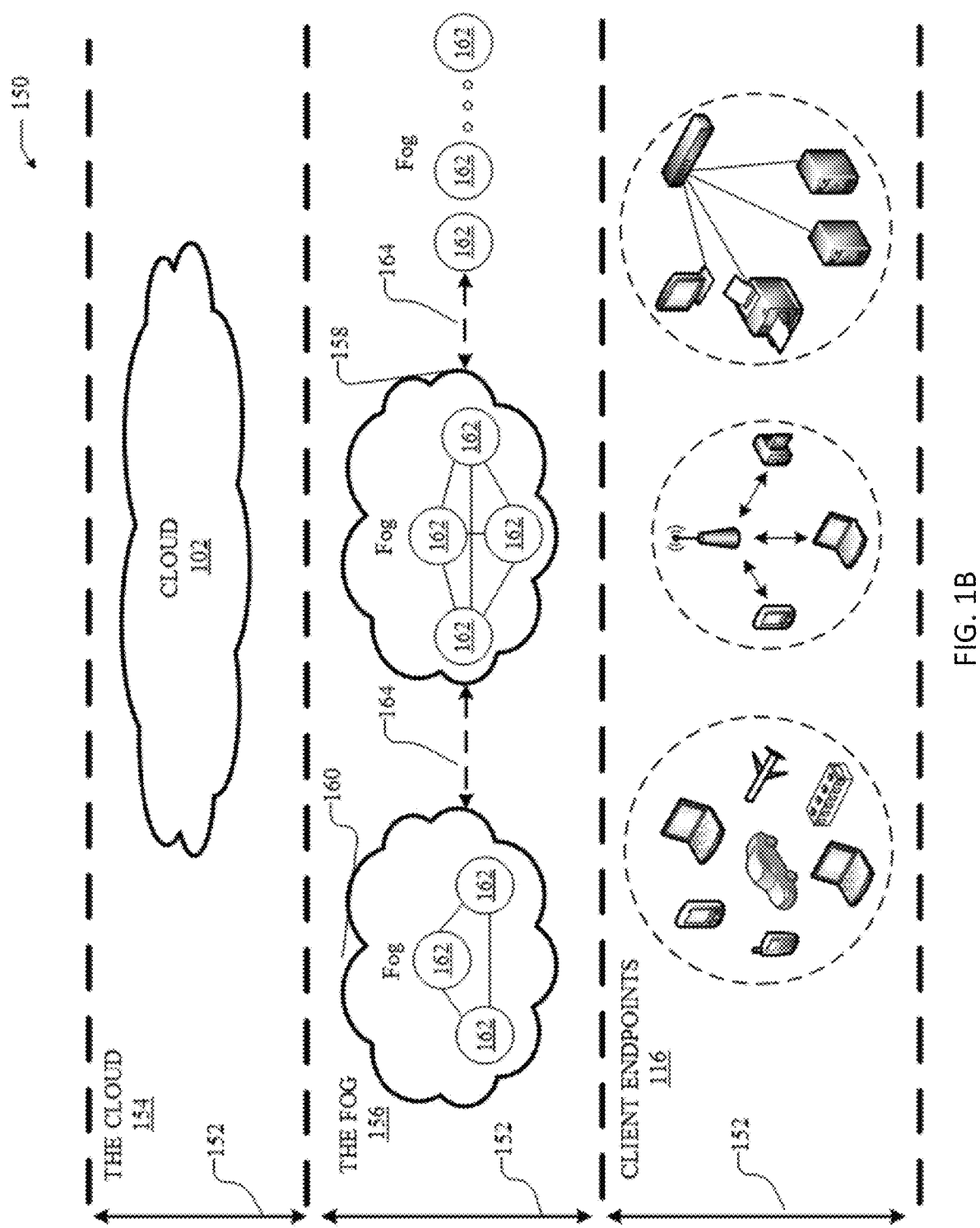
FIG. 1B illustrates an example fog computing architecture according to some aspects of the present disclosure
Figure 2:
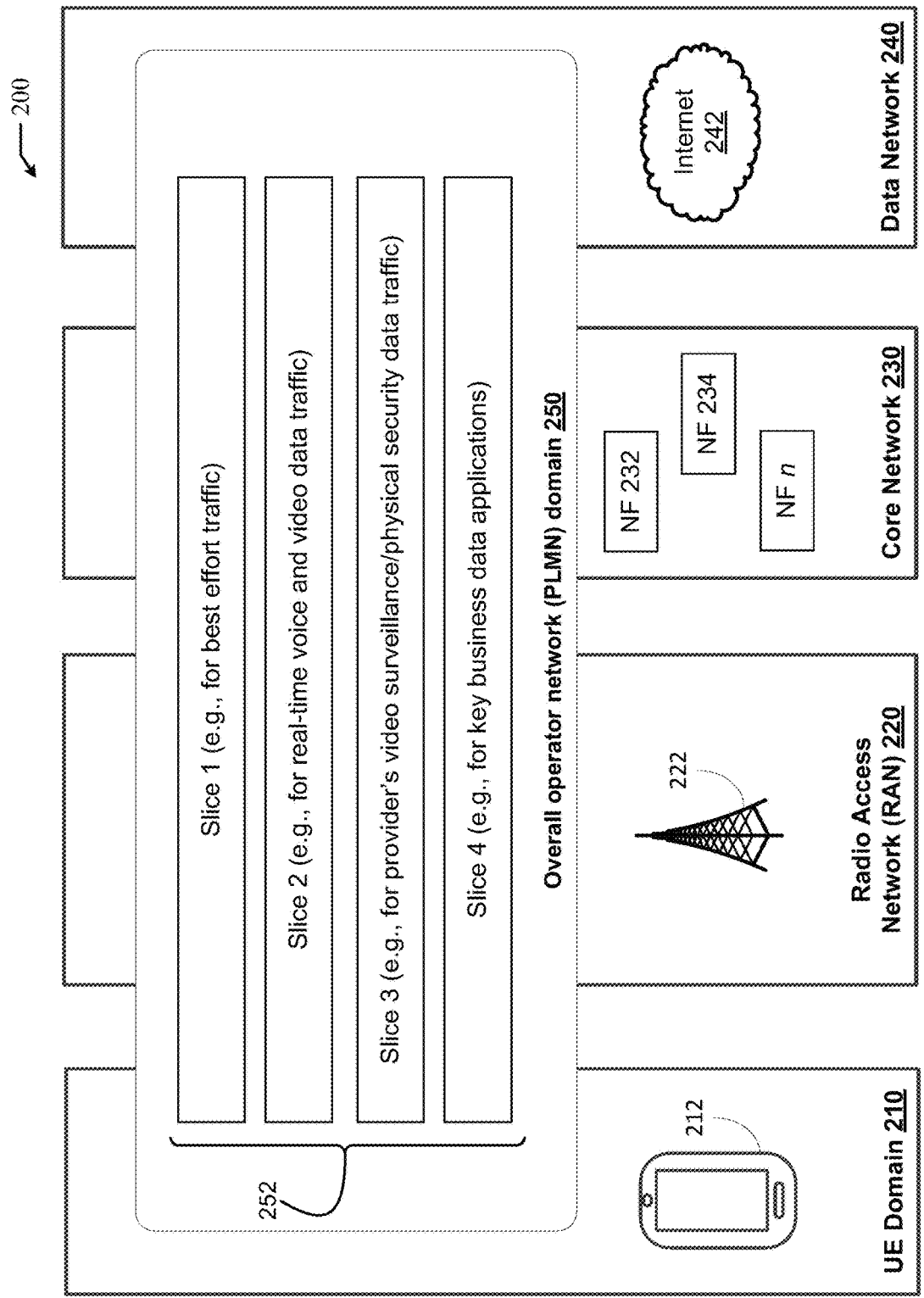
FIG. 2 depicts an exemplary schematic representation of a 5G network environment in which network slicing has been implemented according to some aspects of the present disclosure.

A description of network environments and architectures for network data access and services, as illustrated in FIG. 1A, FIG. 1B, and FIG. 2 is first disclosed herein.

FIG. 1A illustrates a diagram of an example cloud computing architecture according to some aspects of the present disclosure. The architecture 100 can include a cloud 102. The cloud 102 can be used to form part of a TCP connection or otherwise be accessed through the TCP connection. Specifically, the cloud 102 can include an initiator or a receiver of a TCP connection and be utilized by the initiator or the receiver to transmit and/or receive data through the TCP connection. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can be used to provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IOT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture according to some aspects of the present disclosure. The fog 150 computing architecture can be used to form part of a TCP connection or otherwise be accessed through the TCP connection. Specifically, the fog computing architecture can include an initiator or a receiver of a TCP connection and be utilized by the initiator or the receiver to transmit and/or receive data through the TCP connection. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 158 can be local or regional clouds or networks. For example, the fog instances 156, 158 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as an aircraft or train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

FIG. 2 depicts an exemplary schematic representation of a 5G network environment in which network slicing has been implemented according to some aspects of the present disclosure. As illustrated, the network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically execute in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210.

Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the Radio Access Network (RAN) 120, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices actually being used to provision the SaaSs to the enterprise. However, associating SaaSs and SaaS providers with network slices is extremely difficult to achieve without federation across enterprises, network service providers, e.g. 5G service providers, and SaaS providers.

Figure 3:
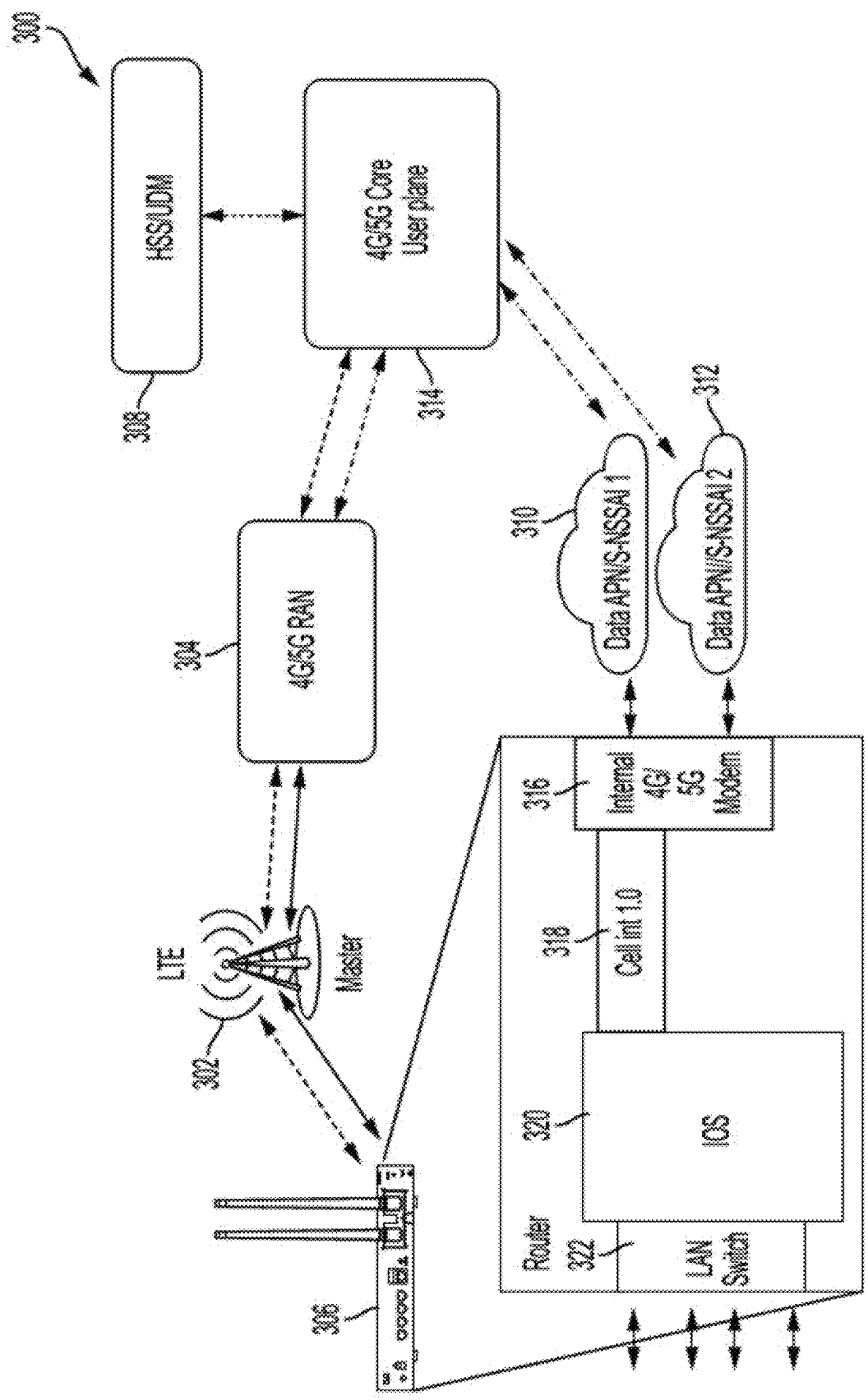
FIG. 3 illustrates a system diagram of a wireless network in communication with a router according to some aspects of the present disclosure.

FIG. 3 illustrates a system diagram of a wireless network in communication with a router according to some aspects of the present disclosure. As illustrated in FIG. 3, the 5G network 300 incorporates one or more master radio nodes 302, a radio access network 304, a user plane of the core network 314, multiple data APNs 310 and 312, and a router 306. The router can include, but not be limited to components including a local area network (LAN) switch 322, an operating system such as IOS 320, a modem 316 capable of 4G or 5G transmissions, and a cell cellular interface 1.0 318 that is configured to facilitate communications between the IOS 320 and the modem 316.

The network 300 as illustrated in FIG. 3 include a master radio node 302 that is configured to communicate with the router 306 and the radio access network 304. The master radio node 302 is configured to provide connectivity to the core network 314 for multiple network appliances connected to router 306. As various types of UEs attempt to register with and connected to network 400, subscriber information may be received from the HSS/UDM 308. For examples, the HSS/UDM 308 can provide to the core network 314 subscriber-related information, such as the authentication information and the list of services to which each user is subscribed. The core network 314 can communicate this information to the router via multiple data APNs, such as the first data APN 310 and the second data APN 312 shown in FIG. 3.

The data APNs 310 and 312 can provide the subscriber information received from the core network 314 to the router 306 to facilitate interconnectivity between UEs and the network 300 via the router 306. Accordingly, through the data APNs 310 and 312, the 5G network provides to the router 306 information on the 5G slices for the device via UE route selection policy (URSP) and/or network slice selection assistance information (NSSAI) features. This information can include, for each slice, an IP address, a subnet mask, a default gateway, and/or a QoS policy, among other known or to be developed information. The modem 316, embedded within the router 306, receives the information on the 5G slices via a cellular interface 1.0 318 that is configured to communicate to the logic (IOS 320) in the router 306.

In some examples, a LAN switch 322 can be utilized to provide connectivity to devices or additional network appliances that are connected via one or more switches of the router 306, to the router 306. Fore examples, the router can be configured to join multiple local area networks to provide additional connectivity within the network 300 environment, wirelessly, or via an Ethernet network.

In this example, the router 306 is unaware of the two interface instances representative of the first data APN 310 and the second data APN 312, and of any associated information as described above. What router 306 is aware of is the cellular interface 1.0 318 assigned to the first data APN 310. Accordingly, a manual configuration is needed to add an additional cellular interface to facilitate communication between the modem 316 and the logic in the 5G module.

Figure 4:
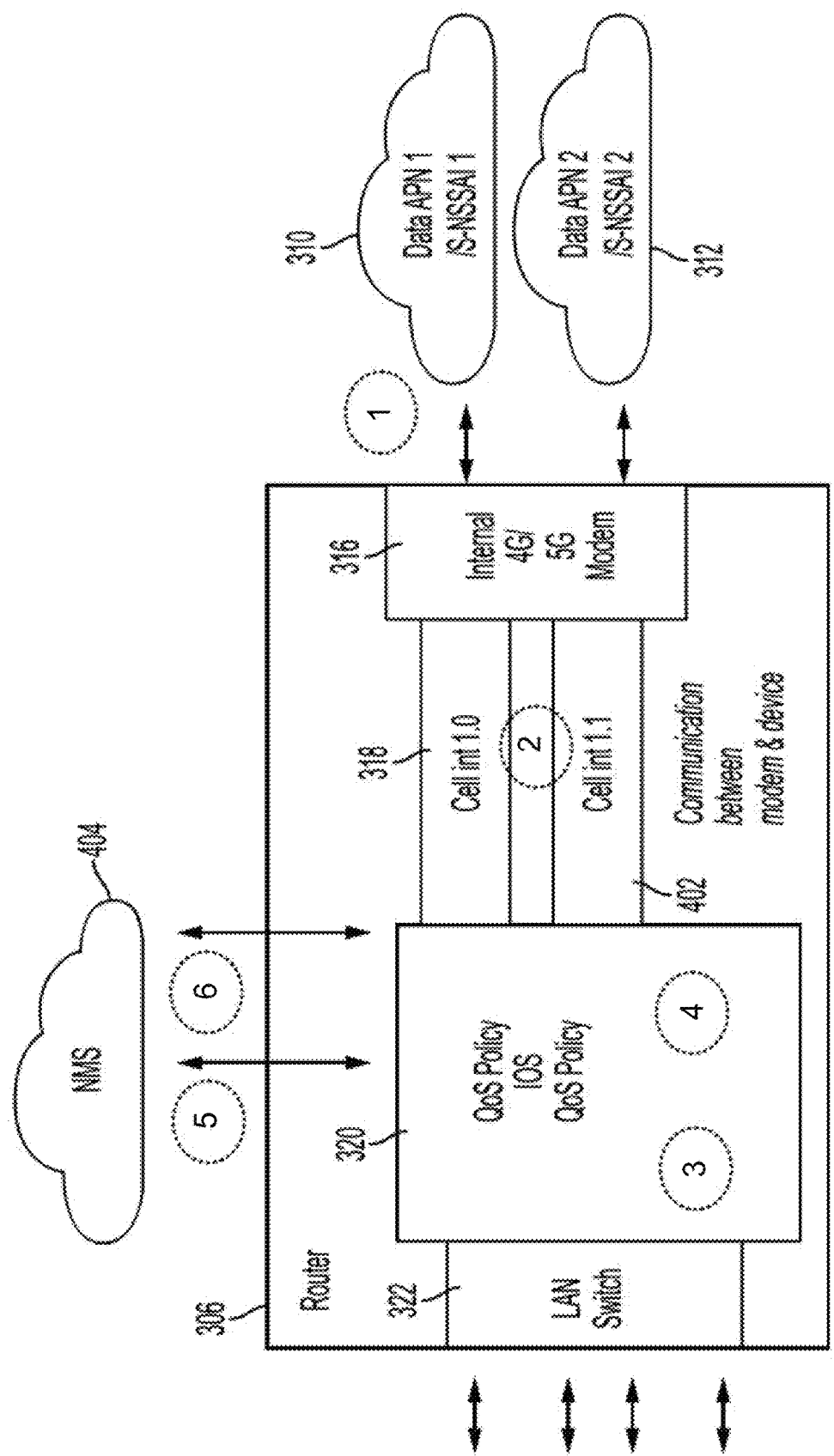
FIG. 4 illustrates functionalities of the router with multiple network slices and QoS policies according to some aspects of the present disclosure.

FIG. 4 illustrates functionalities of the router with multiple network slices and QoS policies according to some aspects of the present disclosure. To ensure that the router 306 can process information received from the second data APN 312 in addition to the first data APN 310, auto-provisioning of network configurations to the router 306 can be provided.

Per ① in FIG. 4, the 5G network provides to the router 306, via the first data APN 310 and the second data APN 312, information on the 5G slices for a user equipment (UE) using the URSP/NSSAI features. This information can include, but is not limited to, an IP address, a subnet mask, a default gateway, QoS policy (SDF, QFI), etc., for each of the network slices (e.g., the data APN 310 and the data APN 312).

Per ② in FIG. 4, the router 306 queries the modem 316 for the information received on the data APN 310 and the data APN 312 at the first step. For example, the communication between the router 306 and the logic in the router 306 can be in an Extensible Markup Language (XML) format that is readable by the logic 320 of the router 306. With the module 316, this communication can be via a USB or other internal interface(s). With a cellular gateway, this communication can be through mGiG Ethernet using an existing or a new protocol (e g. LLDP with extensions for QoS elements and pathing).

Per ③ in FIG. 4, the logic in the router 306 converts the information received about the data APNs 310 and 312 into a standards-based format using a data model. In some examples, the data model can include, but is not limited to, a Yang Model, management information base (MIB) model, and/or an XML model. In an example, there may be one model for the network instances, and one or more models for a QoS policy or pathing policy of the router. This can be accomplished via communications between the modem 316 and logic of the router using standard modem-level commands and logs such as Attention commands (AT).

Per ④ in FIG. 4, the logic 320 generates interfaces, QoS policies, and/or pathing for the multiple slices connected to the modem 316 (e.g., the APN 310 and the APN 312). The generated interfaces, QoS policies, and/or pathing may be referred to as new configuration proposal(s) or configuration parameter(s). Based, on the standards and protocols received the network device would either commit the new configuration proposal(s) into its configuration, thus completing the operation if managed as a standalone, or propose the new configuration proposal(s) for itself to a network management system (NMS) 404 or cloud controller (not shown) for acceptance.

Per ⑤ in FIG. 4, the router 306 can send the new configuration proposal(s) to the NMS 404 for acceptance and adoption. In one example, the router 306 can send, to the NMS 404, an SNMP trap alerting of a new configuration proposal(s) along with translation logic into a data model (either MIB values/MIBs or via netconf/yang and or via OMP/Overlay Management Protocol or others, so it's usable by different management systems)). Alternatively, the router 306 can use an existing protocol such as OMP to send the new configuration proposal(s) to the NMS 404.

In some examples, the communication protocols used for communication between a managed device (e.g., the router 306) and the NMS 404 should be understandable/acceptable to both. Configuration for protocols such as SNMP, OMP, netconf, Meraki management tunnel, etc. may typically be initiated downstream. This requires upstream initiation and proposals including one or more of traffic classes, QoS maps, VPN QoS maps, VPN lists, or WAN interfaces (e.g., each 5G network slice may be a WAN sub-interface). The example described above may be for a Software Defined Wide Area Network (SDWAN) such as SDWANs developed by Cisco, Inc. of San Jose, CA. However, the present disclosure is not limited thereto and may similarly be applied to other SDWANs including, but not limited to, Meraki SDWANs, standards-based SNMP systems, systems based on Yang, etc.

Per ⑥ in FIG. 4, the NMS 404 (or a cloud controller) can determine if the new configuration proposal(s) should be implemented. Upon determining that the new configuration proposal(s) can/should be implemented, the router 306 may be configured with the new configuration proposal(s).

In examples where the network 300 is a standalone network, the communication of the new configuration proposal(s) to the NMS 404 for acceptance, may be skipped and the router 306 may configure itself with the generated interfaces, QoS policies, pathing, etc., as generated per the fourth step of the process described above.

One advantageous aspect of the process described above with reference to FIG. 4 is that it does not require direct communications between a service provider's 5G network and an Enterprise NMS (e.g. DNAC, vManage, Meraki Dashboard, etc., which can be represented by the NMS 404). The proposed communication is between a 5G modem (e.g., modem 316) and a 5G CPE (router, cellular gateway such as the IOS/logic 320 in the router 306), followed by additional communication between the 5G CPE and the NMS 404.

Figure 5:
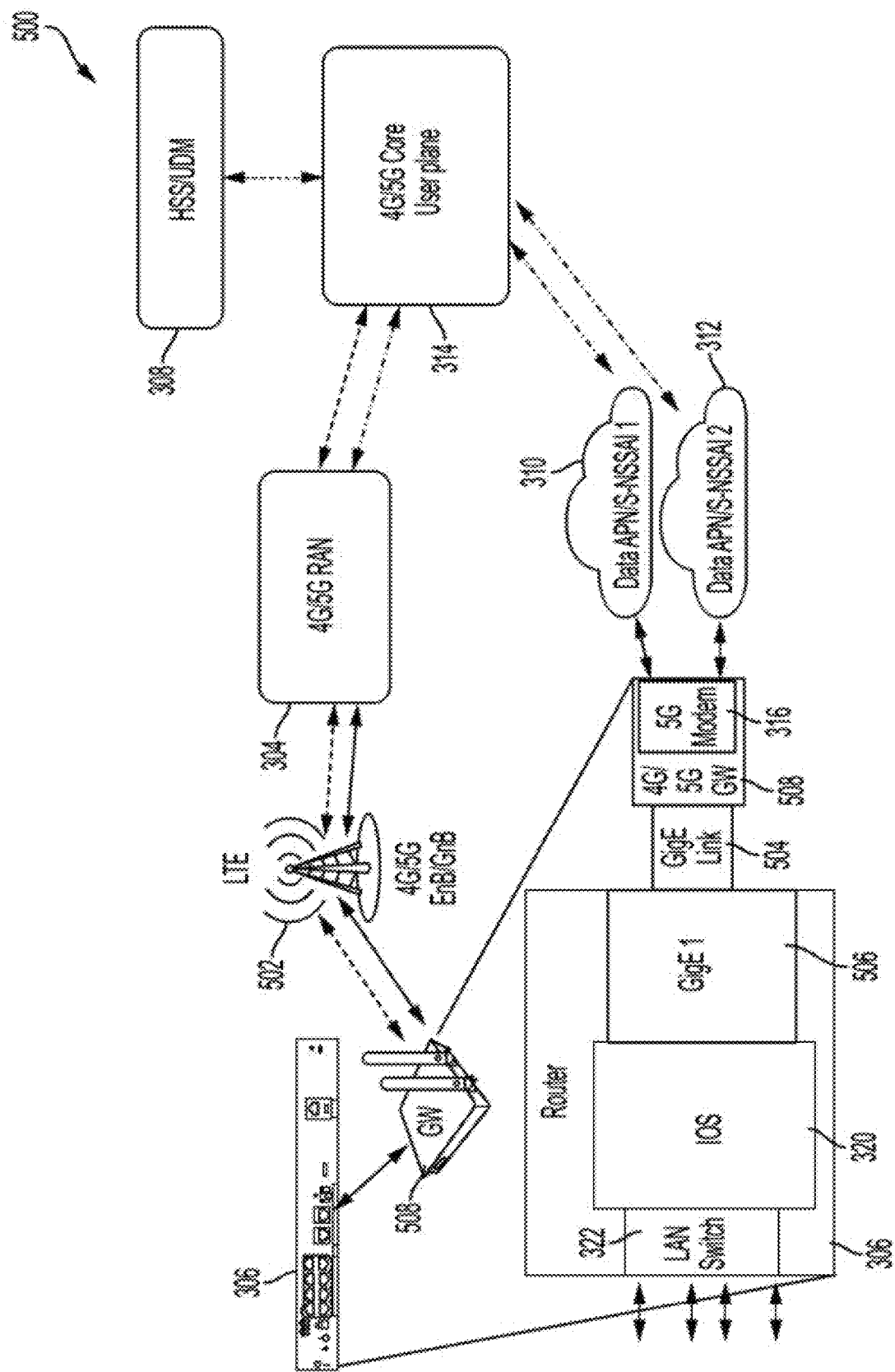
FIG. 5 illustrates a system diagram of a wireless network in communication with a gateway according to some aspects of the present disclosure.

FIG. 5 illustrates a system diagram of a wireless network in communication with a gateway according to some aspects of the present disclosure. In furtherance of the previously described examples in FIG. 3 and FIG. 4, the wireless network 500 can include additional elements such as the gateway 508 in communication with the router 306. The gateway 508 is configured to send data packets that are transmitted to the router 306 to another network appliance in an additional network. The modem 316 that was part of the router 306 in FIG. 4, is now part of the gateway 508 in FIG. 6.

As illustrated in FIG. 5 the wireless network 500 includes a radio node 502 that is configured to communicate with a gateway 508. The gateway 508 may be in communication with the router 306 and the radio access network 304. The radio node 502 is configured to provide connectivity to the core network 314 for multiple CPEs such as CPE 306. The core network 314 can communicate this information to the router via multiple data APNs, such as the first data APN 310 and the second data APN 312 shown in FIG. 5.

The first and second data APNs 310 and 312 can provide subscriber information received from the core network 314 to the router 306 to facilitate interconnectivity of end UEs to the wireless network 500, through a registration of the device with the gateway 508. Accordingly, through the data APNs 310 and 312, the 5G network provides to the router 306 information on the 5G slices for the device using USRP or NSSAI features. As noted above, this information can include, for each slice, an IP address, a subnet mask, a default gateway, and/or a QoS policy, among other known or to be developed information. The modem 316, embedded within the gateway 508, receives the information. The gateway 508 can communicate the information received from the data APNs 310 and 312 via a Gigabit Ethernet (GigE) link 504. In some examples, the protocol can include LLDP with extensions for QoS elements and pathing. The GigE link 504 is configured to communicate the information to the router 306, which receives the information on the 5G slices via a GigE interface 506. Interface 506 may be configured to communicate to the logic 320 (IOS 320) in the router.

As described with reference to FIG. 3, the gateway 508 may be unaware of two interface instances representative of the first data APN 310 and the second data APN 312, and of any associated information as described above. As such, the gateway 508 is only aware of the GigE interface 506 assigned to the first data APN 310. Accordingly, a manual configuration is required to add an additional cellular interface to facilitate communication between the modem 316 of the gateway 508 and the logic in the GigE interface 506.

Figure 6:
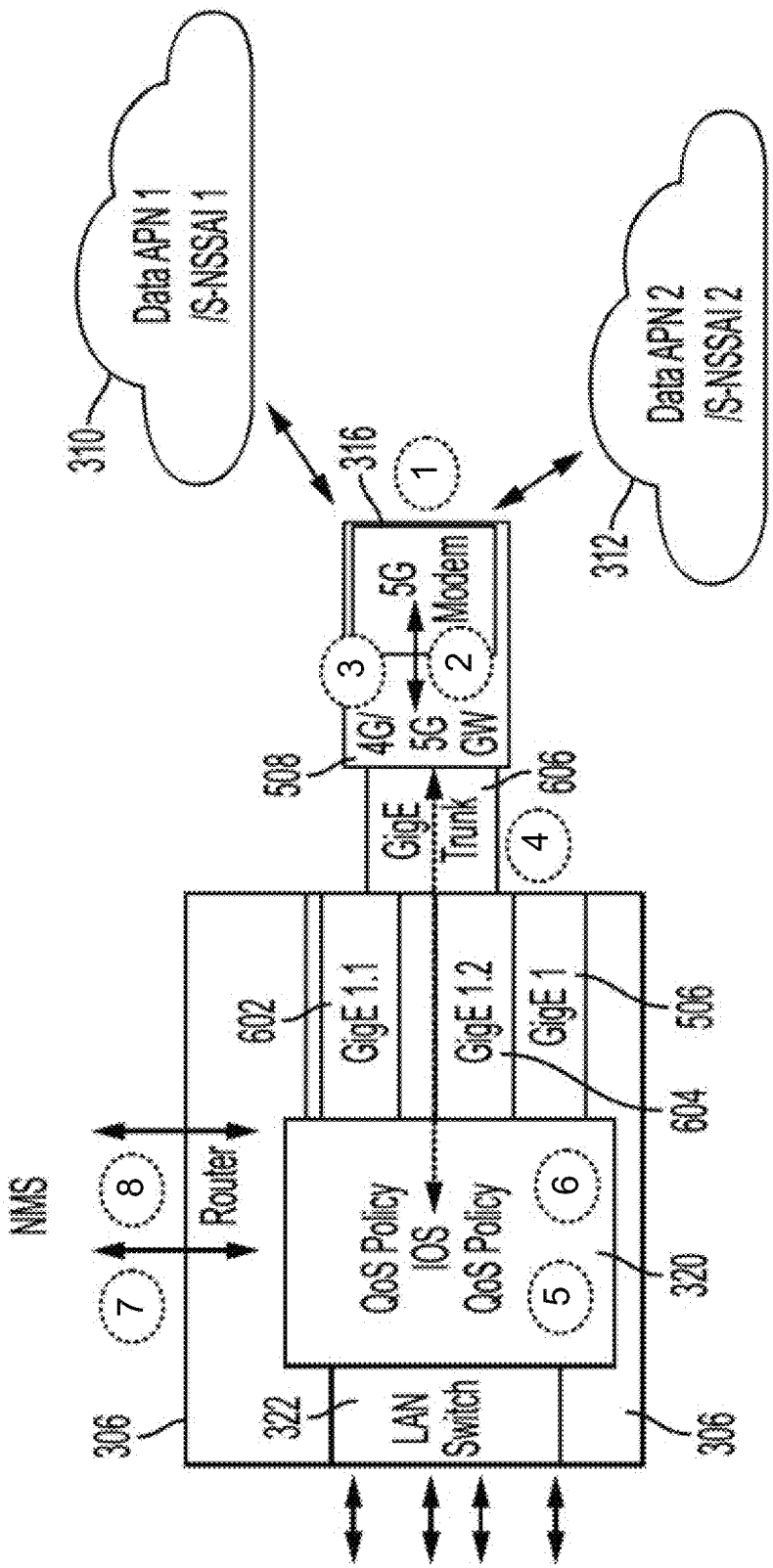
FIG. 6 illustrates a gateway with multiple network slices and QoS policies according to some aspects of the present disclosure.

FIG. 6 illustrates functionalities of the router with multiple network slices and QoS policies according to some aspects of the present disclosure. To ensure that the gateway 508 is able to process information received from the second data APN 312 in addition to the first data APN 310, auto-provisioning of network configurations to the gateway 508 can be provided.

Accordingly, per ① in FIG. 6, the 5G network provides to the modem 316 inside the gateway 508, via the first data APN 310 and the second data APN 312, information on the 5G slices for a user equipment (UE) using the URSP/NSSAI. This information can include, but is not limited to, an IP address, a subnet mask, a default gateway, QoS policy (SDF, QFI), etc., for each of the network slices (e.g., the data APN 310 and the data APN 312).

Per ② in FIG. 6, the gateway 508 queries the modem 316 inside the gateway 508 for the information received on the data APN 310 and the data APN 312 at the first step. For example, the communication between the gateway 508 and the logic in the gateway 508 can be in an Extensible Markup Language (XML) format that is readable by the logic of the gateway 508. With the module 316, this communication can be via a USB or other internal interface(s). With a cellular gateway, this communication can be through mGiG Ethernet using an existing or a new protocol (e.g. LLDP with extensions for QoS elements and pathing).

Per ③ in FIG. 6, the gateway 508 converts the information received about the data APNs 310 and 312 into a standards-based format using a data model. In some examples, the data model can include, but is not limited to, a Yang Model, management information base (MIB) model, and/or an XML model. In an example, there may be one model for the network instances, and one or more models for a QoS policy or pathing policy of the router. This can be accomplished via communications between the modem 316 and logic of the router using standard modem-level commands and logs such as Attention commands (AT).

Per ④ in FIG. 6, the gateway 508 provides the standards-based information to the router 306 via the GigE Trunk 606.

Per ⑤ in FIG. 6, the IOS 320 in the router 306 authenticates, and authorizes acceptance of the data models and the standards-based information.

Per ⑥ in FIG. 6, the IOS 320 in the router 306 generates interfaces, QoS policies, and/or pathing for the multiple slices connected to the modem 316 (e.g., the APN 310 and the APN 312). The generated interfaces, QoS policies, and/or pathing for the multiple slices may be referred to as new configuration proposal(s) or configuration parameter(s).

In another example, gateway 508 generates the interfaces, QoS policies, and/or pathing prior to sending the same to IOS 320.

Per ⑦ in FIG. 6, the router 306 can send the new configuration proposal(s) to the NMS 404 for acceptance and adoption. In one example, the router 306 can send, to the NMS 404, an SNMP trap alerting of a new configuration proposal(s) along with translation logic into a data model (either MIB values/MIBs or via netconf/yang and or via OMP/Overlay Management Protocol or others, so it's usable by different management systems)). Alternatively, the router 306 can use an existing protocol such as OMP to send the new configuration proposal(s) to the NMS 404.

In some examples, the communication protocols used for communication between a managed device (e.g., the router 306) and the NMS 404 should be understandable/acceptable to both. Configuration for protocols such as SNMP, OMP, netconf, Meraki management tunnel, etc. may typically be initiated downstream. This requires upstream initiation and proposals including one or more of traffic classes, QoS maps, VPN QoS maps, VPN lists, or WAN interfaces (e.g., each 5G network slice may be a WAN sub-interface). The example described above may be for a Software Defined Wide Area Network (SDWAN) such as SDWANs developed by Cisco, Inc. of San Jose, CA. However, the present disclosure is not limited thereto and may similarly be applied to other SDWANs including, but not limited to, Meraki SDWANs, standards-based SNMP systems, systems based on Yang, etc.

Per ⑧ in FIG. 6, the NMS 404 (or a cloud controller) can determine if the new configuration proposal(s) should be implemented. Upon determining that the new configuration proposal(s) can/should be implemented, the router 306 may be configured with the new configuration proposal(s).

In examples where the network 300 is a standalone network, the communication of the new configuration proposal(s) to the NMS 404 for acceptance, may be skipped and the router 306 may configure itself with the generated interfaces, QoS policies, pathing, etc., as generated per the fourth step of the process described above.

Figure 7:
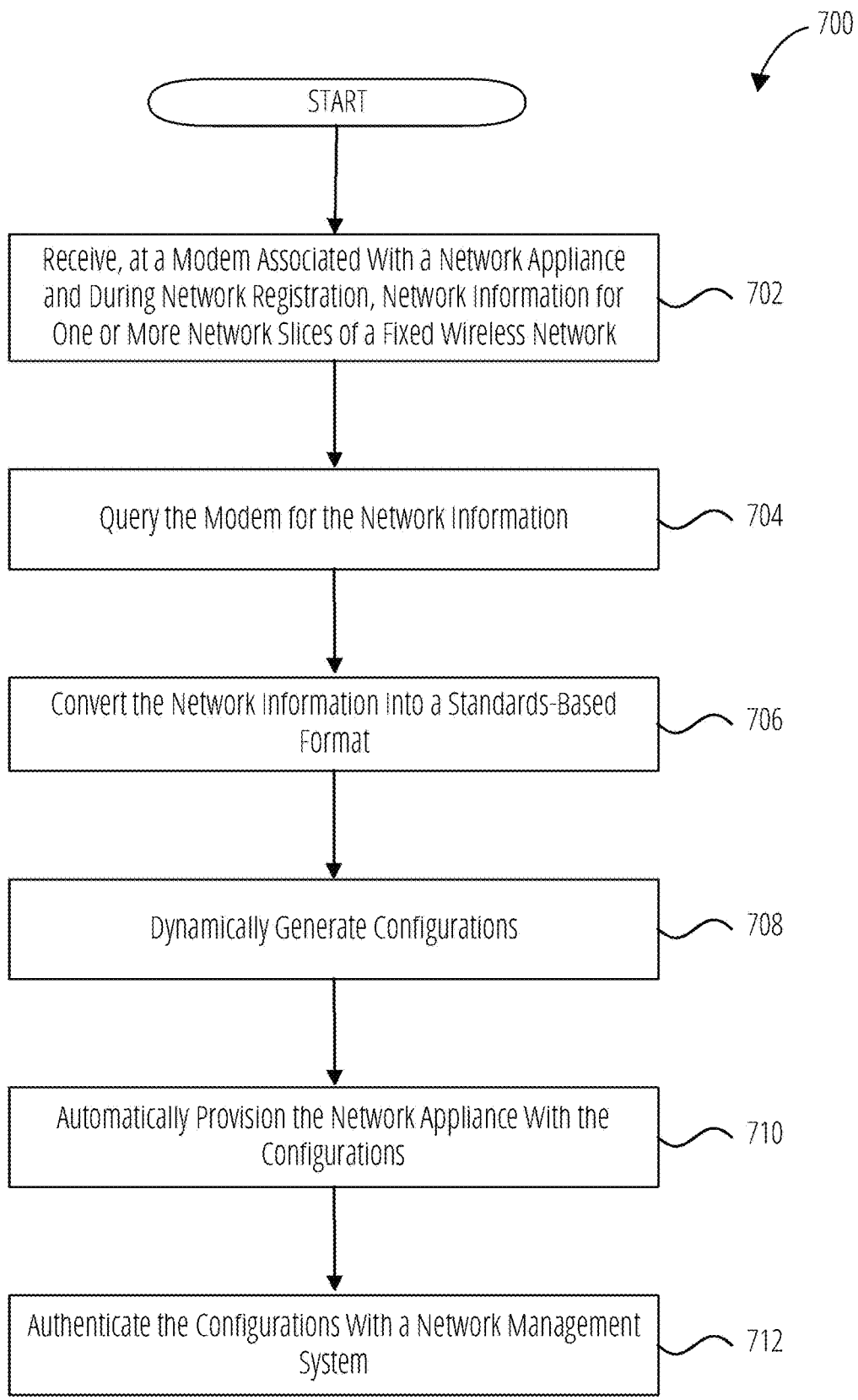
FIG. 7 illustrates a flow chart of auto provisioning for a CPE according to some aspects of the present disclosure.

FIG. 7 illustrates an example method 700 for auto provisioning a CPE such as router 306. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

At step 702, a modem (e.g., modem 316) may receive network information for one or more network slices of a fixed wireless network. For example, the modem 316 to which one or more network appliances may be connected (wired and/or wirelessly), may receive the network information for one or more network slices (e.g., data APN 310 and Data APN 312). This information can be received from the wireless network with which the modem 316 interfaces.

In some examples, the network information can include, but is not limited to, a number of network slices, one or more of an IPV4/IPv6 address and mask, a default gateway (e.g., default gateway), DNS server identification, QoS traffic/flow template including QoS classification (e.g., DSCP), QoS behavior per traffic class (e.g., QCI), ingress (e.g., into 4G/5G network) policing value if available, etc. This step may be performed as described above with reference to FIGS. 4 and 6 (per ① in FIGS. 4 and 6).

At step 704, a network appliance (e.g., gateway 508 and/or router 306) may determine network information for the one or more network slices. In one example, this determining can include querying, by the network appliance, the modem 316 for the network information on the one or more network slices (e.g., data APN 310 and Data APN 312), For example, the router 306 illustrated in FIG. 4 or gateway 508 of FIG. 6 may query the modem 316 for the network information that it received from the wireless network at step 702.

At step 706, the network appliance may convert the network information into a standards-based format (e.g., any one or more of Yang, MIB, and/or XML, as described above). In one example, the IOS 320 illustrated in FIG. 4 may convert by the network appliance the network information into a standards-based format. In another example, the gateway 508 may perform the conversion at step 706, as described above with reference to FIG. 6.

At step 708, the network appliance may determine (generate) configuration parameters for the one or more network slices for configuring a CPE therewith (where the CPE can be router 306, gateway 508, etc.). In one example, the configuration parameters may be determined using the standards-based version of the network information as generated/created per step 706. In one example, IOS 320 in router 306 may determine the configuration parameters as described with reference to FIGS. 4 and 6. In another example, the gateway 508 may determine the configuration parameters.

In one example, the configuration parameters can include, but are not limited to, interfaces corresponding to data APN 310 and 312, QoS policies, and pathing as described above. Such configuration parameters can be determined/generated according to any known or to be developed method.

In some examples, where the gateway 508 determines the configuration parameters, the gateway 508 may send the configuration parameters to the router 306 via new or existing protocols (e.g., enhanced CDP/LLDP, etc.).

In one example, determining the configuration parameters at step 708 may be performed dynamically.

At step 710, the network appliance may update itself (provision itself) with the configuration parameters determined at step 708. In one example, the network appliance to be provisioned (e.g., the router 306 and/or the gateway 508) may be under management of a network management system such as the NMS 404. In this instance, the network appliance may provide the configuration parameters to the NMS 404 to be validated/accepted. Upon receiving a notification of the acceptance of the configuration parameters, the network appliance can provision itself (and optionally, one or more additional network appliances such as additional routers, gateways, etc.) with the configuration parameters.

In another example, the network appliance may not be under management. In this instance, the network appliance may automatically provision itself with the configuration parameters determined at step 708.

Figure 8:
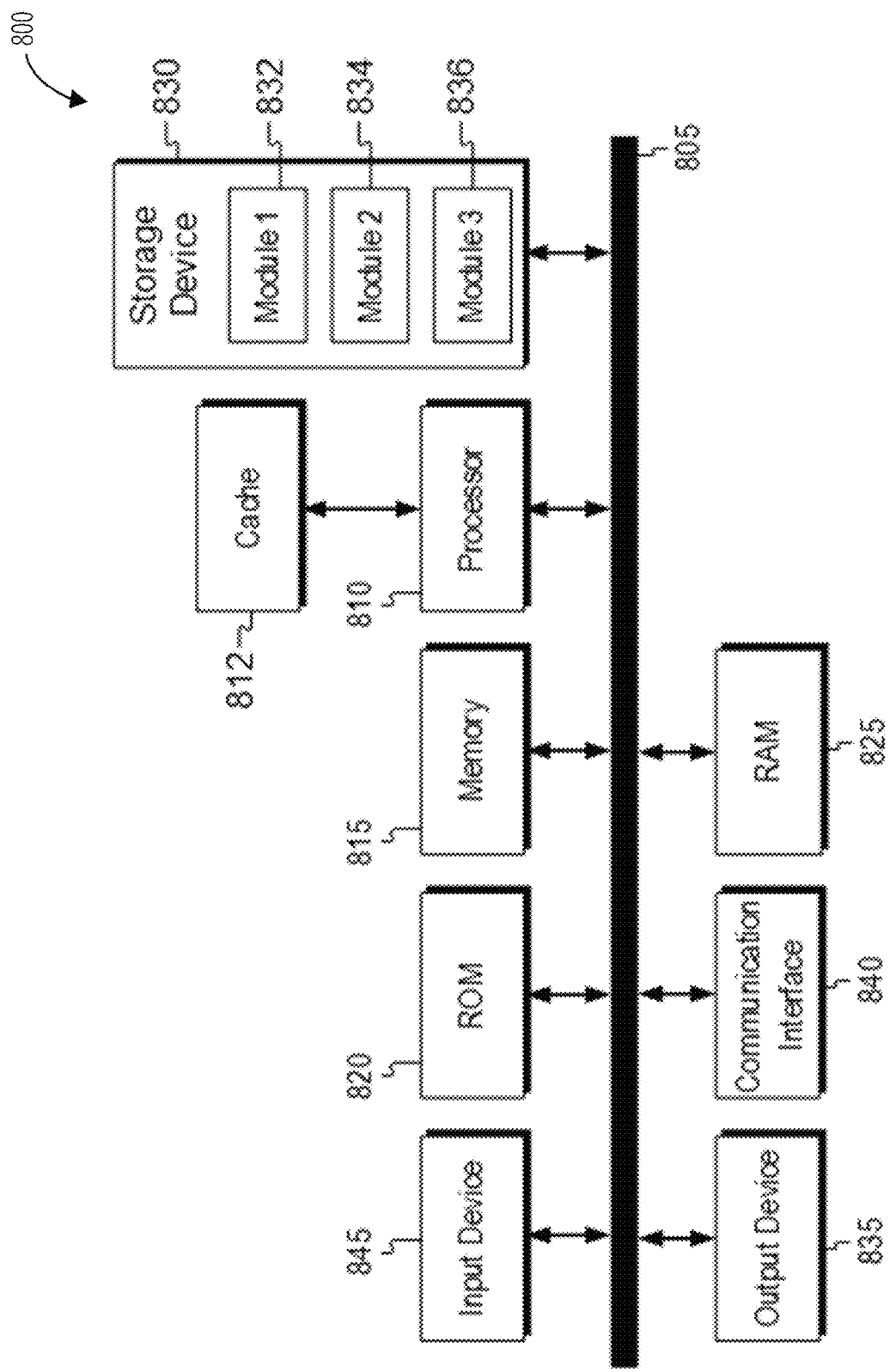
FIG. 8 shows an example of computing system according to some aspects of the present disclosure.

FIG. 8 shows an example of computing system 800, which can be for example any computing device that can perform functionalities of one or more network components described above (e.g., the router 306, the gateway 508, the modem 316, etc.). Computing system 800 and/or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments computing system 800 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Figure 9:
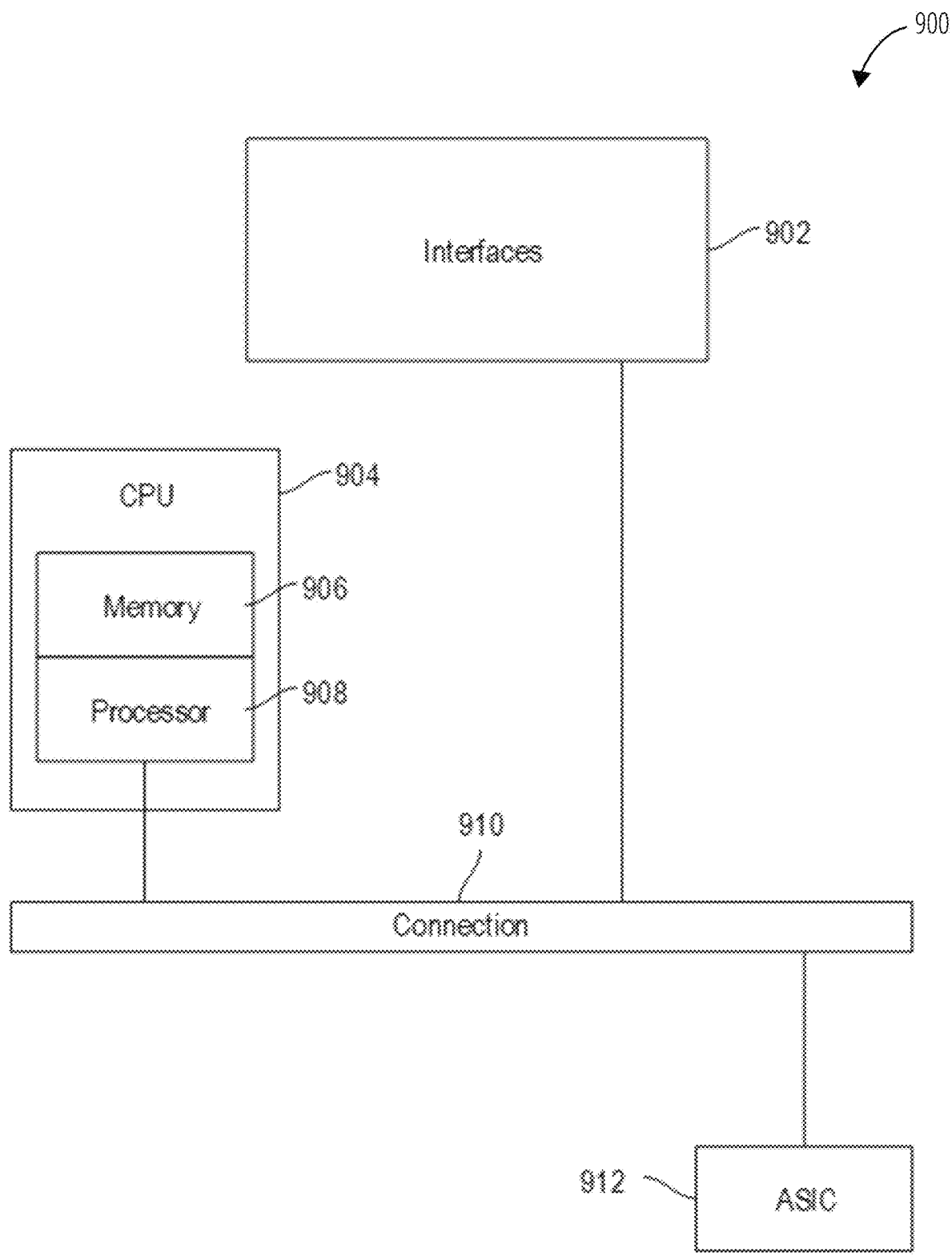
FIG. 9 illustrates an example network device according to some aspects of the present disclosure.

FIG. 9 illustrates an example network device 900 suitable for performing switching, routing, load balancing, and other networking operations. The example network device 900 can be implemented as switches, routers, nodes, metadata servers, load balancers, client devices, and so forth.

Network device 900 includes a central processing unit (CPU) 904, interfaces 902, and a bus 910 (e.g., a PCI bus). When acting under the control of appropriate software or firmware, the CPU 904 is responsible for executing packet management, error detection, and/or routing functions. The CPU 904 preferably accomplishes all these functions under the control of software including an operating system and any appropriate applications software. CPU 904 may include one or more processors 908, such as a processor from the INTEL X86 family of microprocessors. In some cases, processor 908 can be specially designed hardware for controlling the operations of network device 900. In some cases, a memory 906 (e.g., non-volatile RAM, ROM, etc.) also forms part of CPU 904. However, there are many different ways in which memory could be coupled to the system.

The interfaces 902 are typically provided as modular interface cards (sometimes referred to as "line cards"). Generally, they control the sending and receiving of data packets over the network and sometimes support other peripherals used with the network device 900. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 904) to efficiently perform routing computations, network diagnostics, security functions, etc.

Although the system shown in FIG. 9 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 900.

Regardless of the network device's configuration, it may employ one or more memories or memory modules (including memory 906) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 906 could also hold various software containers and virtualized execution environments and data.

The network device 900 can also include an application-specific integrated circuit (ASIC) 912, which can be configured to perform routing and/or switching operations. The ASIC 912 can communicate with other components in the network device 900 via the bus 910, to exchange data and signals and coordinate various types of operations by the network device 900, such as routing, switching, and/or data storage operations, for example.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general-purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    querying, by a network appliance, a modem of the network appliance for information associated with each of a plurality of network slices available to the network appliance, the plurality of network slices including a 4G network slice and a 5G network slice;
    generating, by the network appliance, configuration information for the plurality of network slices based on the information queried from the modem;
    converting, by the network appliance, the configuration information into a standards-based format that is understandable by a network management system that manages the network appliance to yield a set of configuration parameters for the network appliance; and
    sending, by the network appliance the configuration parameters to the network management system for enabling provisioning of the network appliance with the configuration parameters.

2. The method of claim 1, wherein the configuration information includes one or more of a number of network slices, one or more of an IPV4/IPv6 address and mask, a default gateway address, a DNS server identification, QoS templates including QoS classification, QoS behavior per traffic class, and ingress policing value.

3. The method of claim 1, wherein the configuration parameters include one or more of network interfaces, a quality of service (QOS) policy, and pathing information.

4. The method of claim 1, wherein the configuration information is converted into the standards-based format using one or more data models.

5. The method of claim 1, further comprising:
    updating the network appliance with the configuration parameters.

6. The method of claim 1, wherein the network appliance is one of a router or a gateway of an enterprise network.

7. A device comprising:
    one or more memories having computer-readable instructions stored therein; and
    one or more processors configured to execute the computer-readable instructions to:
        query a modem of the device for information associated with each of a plurality of network slices available to the network appliance, the plurality of network slices including a 4G network slice and a 5G network slice;
        generate configuration information for the plurality of network slices based on the information queried from the modem;
        convert the configuration information into a standards-based format that is understandable by a network management system that manages the device to yield a set of configuration parameters for the network appliance; and
        send the configuration parameters to the network management system for enabling provisioning of the device with the configuration parameters.

8. The device of claim 7, wherein the configuration information includes one or more of a number of network slices, one or more of an IPV4/IPv6 address and mask, a default gateway address, a DNS server identification, QoS templates including QoS classification, QoS behavior per traffic class, and ingress policing value.

9. The device of claim 7, wherein the configurations include one or more of network interfaces, a quality of service (QOS) policy, and pathing information.

10. The device of claim 7, wherein the configuration information is converted into the standards-based format using one or more data models.

11. The device of claim 7, wherein the one or more processors are configured to execute the computer-readable instructions to:
    update the device with the configuration parameters.

12. The device of claim 7, wherein the device is one of a router or a gateway of an enterprise network.

13. One or more non-transitory computer-readable media comprising computer-readable instructions, which when executed by one or more processors of a network appliance, cause the network appliance to:
    query a modem of the network appliance for information associated with each of a plurality of network slices available to the network appliance, the plurality of network slices including a 4G network slice and a 5G network slice;
    generate configuration information for the plurality of network slices based on the information queried from the modem;
    convert the configuration information into a standards-based format that is understandable by a network management system that manages the network appliance to yield a set of configuration parameters for the network appliance; and
    send the configuration parameters to the network management system for enabling provisioning of the network appliance with the configuration parameters.

14. The one or more non-transitory computer-readable media of claim 13, wherein the configuration information includes one or more of a number of network slices, one or more of an IPv4/IPv6 address and mask, a default gateway address, a DNS server identification, QoS templates including QoS classification, QoS behavior per traffic class, and ingress policing value.

15. The one or more non-transitory computer-readable media of claim 13, wherein the configurations include one or more of network interfaces, a quality of service (QoS) policy, and pathing information.

16. The one or more non-transitory computer-readable media of claim 13, wherein the configuration information is converted into the standards-based format using one or more data models.

17. The one or more non-transitory computer-readable media of claim 13, wherein the execution of the computer-readable instructions by the one or more processors cause the network appliance to:
    update the network appliance with the configuration parameters.

* * * * *